No. 729,791. PATENTED JUNE 2, 1903.
W. OLMSTEAD.
SPUR.
APPLICATION FILED MAY 6, 1902.
NO MODEL.
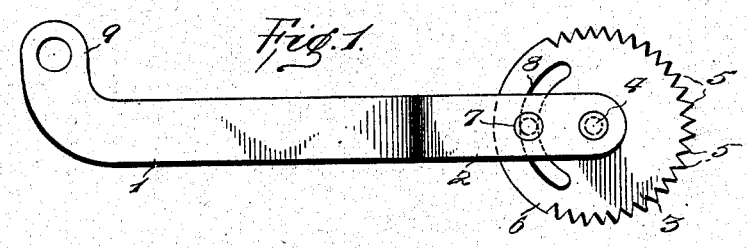
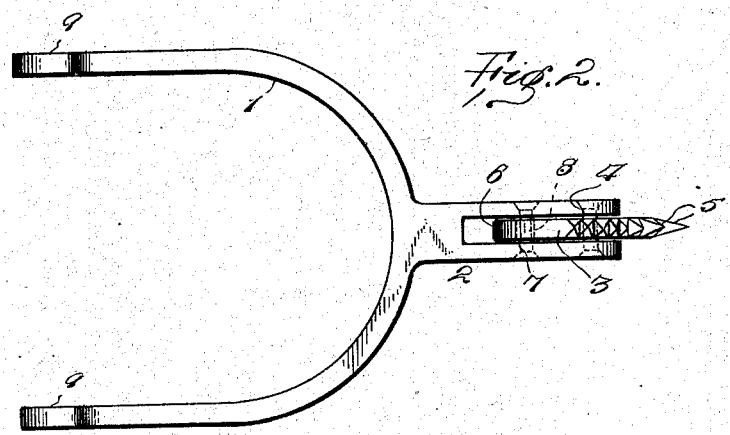
Witnesses
O. M. Simpson
J. F. Riley
W. Olmstead Inventor
by C. A. Snow & Co.
Attorneys No. 729,791.

Patented June 2, 1903.

UNITED STATES PATENT OFFICE.

WALTER OLMSTEAD, OF BEEFCREEK, INDIAN TERRITORY.

SPUR.

SPECIFICATION forming part of Letters Patent No. 729,791, dated June 2, 1903.

Application filed May 6, 1902. Serial No. 106,212. (No model.)

*To all whom it may concern:*

Be it known that I, WALTER OLMSTEAD, a citizen of the United States, residing at Beefcreek, in Chickasaw Nation, Indian Territory, have invented a new and useful Spur, of which the following is a specification.

The invention relates to improvements in spurs.

The object of the present invention is to improve the construction of spurs, more especially the manner of mounting the rowel, and to provide a simple and inexpensive spur provided with a rowel having a limited rotary movement and adapted when at the limit of its movement to enable a rider to clamp with his legs a horse without liability of the spurs slipping on the same, as is the case when an ordinary rotary rowel is used.

A further object of the invention is to increase the strength of the means for attaching the rowel and to prevent the same from becoming lost when the pivot wears out.

The invention consists in the construction and novel combination and arrangement of parts hereinafter fully described, illustrated in the accompanying drawings, and pointed out in the claims hereto appended.

In the drawings, Figure 1 is a side elevation of a spur constructed in accordance with this invention. Fig. 2 is a plan view.

Like numerals of reference designate corresponding parts in all the figures of the drawings.

1 designates a spur-frame, which may be of any desired construction and which is provided with a rearwardly-extending rowel stud or shank 2, upon which is mounted a rowel 3. The rowel stud or shank, which may be of any desired construction, is preferably provided with a slot or bifurcation for the reception of the rowel 3. The rowel 3, which is capable of a limited rotary movement, is mounted on a pivot 4, and is provided at its periphery with teeth 5, extending about two-thirds of the distance around the rowel and arranged at the back, top, and bottom of the same. The front portion 6 of the periphery of the rowel is smooth and does not come in contact with an animal. The pivot 4 preferably consists of a rivet which extends across the slot or bifurcation of the rowel shank or stud, and the rowel is also connected with the shank or stud by means of a transverse fastening device 7, mounted on the shank or stud and passing through a curved slot or opening 8.

The curved slot or opening 8 is arranged parallel with the smooth portion 6 of the periphery of the rowel, and is located adjacent to the said smooth portion and is also concentric with a pivot of the rowel. This slot extends about one-third of the distance around the rowel, and it permits a limited rotary movement of the same. When the rowel is at the limit of its movement, it will prevent the spur from slipping, and the said spur may be used to prevent a rider from falling off a horse and can be engaged with the cinchplate or buckle or with the sides of the animal for this purpose.

The pivot on which the rowel rotates receives the greater wear, and the fastening device, which passes through the slot, receives very little wear, so that when the pivot is worn through and becomes broken the fastening device 7 will prevent the rowel, which would otherwise become lost, from leaving the shank or stud. Owing to the unequal wear on the rivets, both cannot become worn out at the same time and the rowel cannot become lost. The sides of the spur-frame are provided with upwardly-extending ears or portions 9, designed to be attached to a strap and adapted to hold the spur up and prevent the same from dropping too low on the heel of a boot.

It will be seen that the spur is simple and comparatively inexpensive in construction, that the strength and durability of the rowel are increased, and that the means which limit the movement of the rowel to prevent the same from slipping or to serve to prevent the rowel from becoming lost should the pivot wear out or break. Furthermore, it will be clear that as the smooth portion 6 of the periphery of the rowel lies in the opening or bifurcation of the rowel stud or shank and the teeth or projections 5 are located at points remote from the said shank or stud there is no liability of the teeth or projections accidentally catching in the stud or shank and interfering with the rotation and operation of the rowel, as is the case with rowels of the ordinary construction when they become loose and move transversely in the slot or bifurcation. Any transverse movement in the slot or bifurcation of a rowel, provided throughout its entire periphery with teeth or projections, will cause such teeth or projections to catch on the edges of the shank or stud, whereby the rowel will be prevented from rotating.

What I claim is—

1. A spur provided with a rotary rowel and having means for limiting the rotary movement of the rowel, whereby the said rowel is capable of a limited rotary movement to permit the spur to be operated in the ordinary manner and is prevented from slipping at the end of such movement, substantally as described.

2. A spur provided with a rowel having a limited rotary movement and adapted when at the limit of its movement, to prevent the spur from slipping, said rowel being provided at its front with a smooth portion and having projections or teeth at the top, bottom and back, substantially as described.

3. A spur provided with a rowel having a curved slot or opening, and a fastening device passing through the slot or opening of the rowel and arranged to limit the movement of the same and adapted to prevent the rowel from becoming lost should the pivot thereof break, substantially as described.

4. A spur provided with a rowel having a limited rotary movement and provided adjacent to its support with a smooth peripheral portion, whereby the rowel is prevented from catching on its support, substantially as and for the purpose described.

5. A spur comprising a frame having a rowel stud or shank, a rowel pivoted to the stud or shank and provided at its periphery with teeth or projections arranged at points remote from the stud or shank, said rowel being provided adjacent to the shank or stud with a smooth peripheral portion to prevent it from catching on the same, and means for limiting the rotary movement of the rowel, substantially as described.

In testimony that I claim the foregoing as my own I have hereto affixed my signature in the presence of two witnesses.

WALTER OLMSTEAD.

Witnesses:
L. A. WEAVER,
N. W. WEAVER.